United States Patent [19]

Sporn

[11] Patent Number: 5,503,109
[45] Date of Patent: Apr. 2, 1996

[54] GROOMING BRUSH WITH ERGONOMIC HANDLE

[76] Inventor: Joseph S. Sporn, 274 W. 86th St., New York, N.Y. 10024

[21] Appl. No.: 348,498

[22] Filed: Dec. 2, 1994

[51] Int. Cl.$^6$ ............................ A01K 13/00; A45D 24/00
[52] U.S. Cl. ............................................. 119/94; 132/150
[58] Field of Search ......................... 119/94, 83, 86; 15/143.1, 145; 132/150

[56] References Cited

U.S. PATENT DOCUMENTS

| | | | |
|---|---|---|---|
| 1,852,362 | 4/1932 | Newby | 132/150 |
| 2,150,260 | 3/1939 | Berry | 132/150 |
| 2,633,591 | 4/1953 | Servilla | 132/150 |
| 3,010,131 | 11/1961 | Kisky | 15/143.1 |
| 3,474,481 | 10/1969 | Soleymani et al. | 15/143.1 |
| 4,974,286 | 12/1990 | Stowell et al. | 15/143.1 |
| 5,305,490 | 4/1994 | Lundgren | 15/143.1 |

FOREIGN PATENT DOCUMENTS

| | | | |
|---|---|---|---|
| 987820 | 8/1951 | France | 132/150 |
| 2840429 | 3/1980 | Germany | 15/143.1 |

Primary Examiner—Todd E. Manahan
Attorney, Agent, or Firm—Michael Ebert

[57] ABSTRACT

A handle for a grooming brush that makes it possible for a groomer to grip the handle in a manner effecting optimal control for a selected mode of brushing activity, such as vigorous, down-stroke brushing. The handle has an elongated body, the front portion of which is joined to the rear of the brush at its center. The body of the handle is contoured to define in the front portion thereof a raised center thumb rest and depression on either side thereof forming left and right side thumb rests. The groomer who grips the body of the handle with his fingers may then press his thumb onto the center thumb rest to carry out one mode of brushing activity, or onto either of the side thumb rests to carry out other modes of brushing activity.

5 Claims, 2 Drawing Sheets

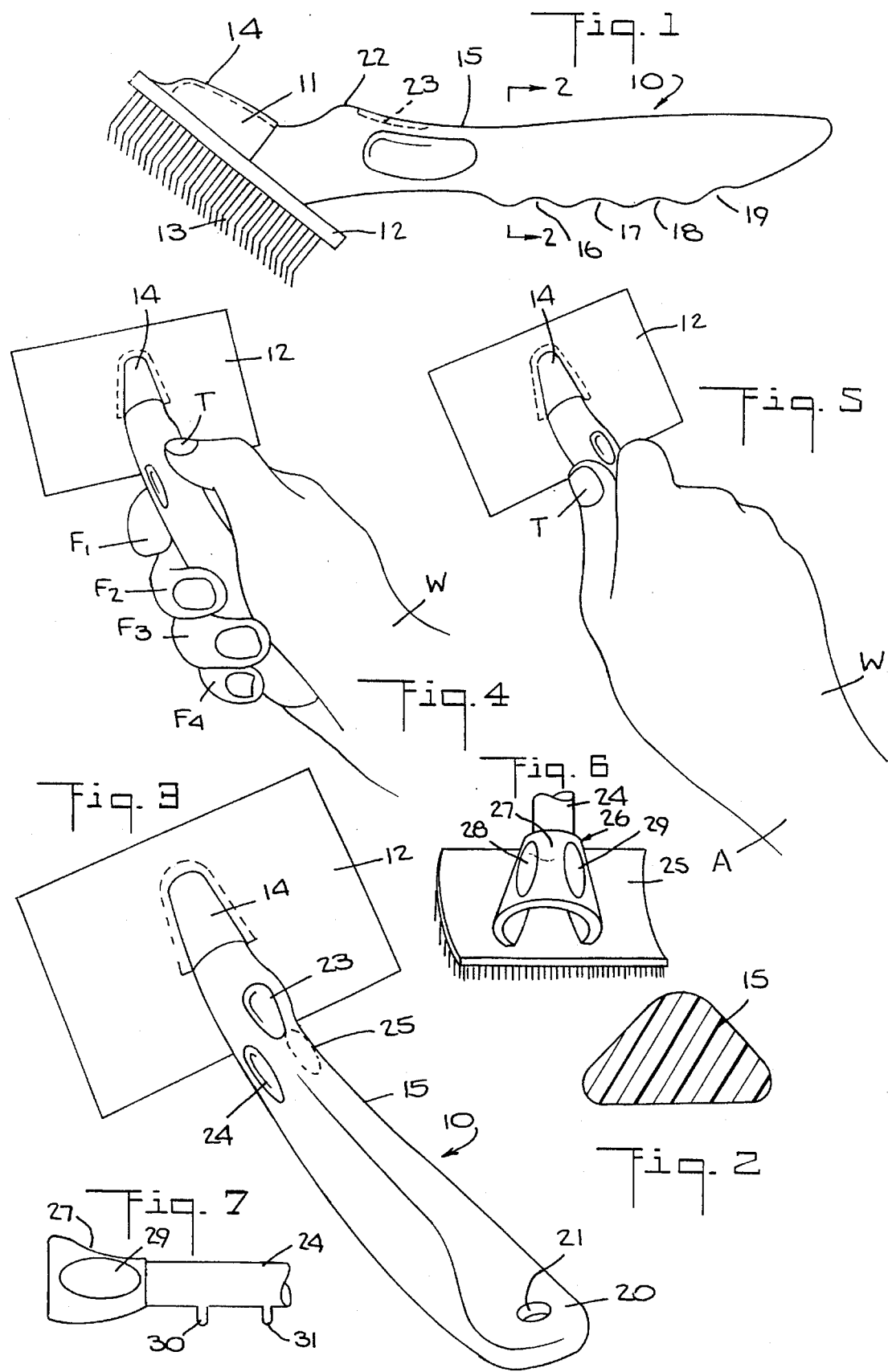

GROOMING BRUSH WITH ERGONOMIC HANDLE

BACKGROUND OF INVENTION

1. Field of Invention

This invention relates generally to handles for brushes to groom pets, and in particular to a handle which can be gripped by the left or right hand of a groomer to effect optimal control of the brush for a selected mode of brushing activity.

2. Status of Prior Art

The external growth of an animal, which take the form of fur or wool, is generally referred to as its coat. Proper grooming of the coat is essential to the health as well as the appearance of dogs and other pet animals. The hair of a dog's coat have a tendency to become entangled and matted. It is difficult to bathe a dog to remove filth, vermin and other possible causes of disease from the dog's skin unless the hairs which cover the skin are free of tangles and are unmatted. A brush for grooming a dog or other pet animal must, therefore, to be effective, be capable of dematting the coat and also of removing dead and unwanted hairs therefrom. A dog must be brushed regularly to remove dead hair and to ensure a lustrous, healthy coat.

There exist over two hundred distinct breeds of dogs, each having a characteristic coat whose nature dictates the various modes of brushing activity appropriate to the coat. Thus, in the case of terriers, such as an Airdale or a Wire Fox, the proper brushing procedure is to first brush gently in the direction of hair growth, and then more vigorously against this direction to remove mats and tangles. With a dog having a long and flowing coat, such as an Irish Setter, it is best to brush in the direction of hair growth, parting the layers in doing so. To avoid breakage of the hairs, the groomer must use a light stroke that goes beyond the ends of the long hairs.

The dead hairs on the coats of poodles do not readily fall out. Hence, with these dogs, one must brush vigorously to the skin to avoid deep matting. Such brushing should be performed at least two or three times a week. And in the case of dogs such as sheep dogs and Collies with harsh outer coats and soft wooly undercoats, then one must work on a small section at a time, parting the hair to the skin and brushing in the direction of hair growth while using a light stroke to avoid removing an excessive amount of wooly undercoat. In the case of cats, those with short hairs require brushing modes different from the modes necessary for longhaired cats.

A conventional brush for grooming pets is provided with a round handle that when firmly gripped by the fingers and thumb of the hand of the groomer will not rotate in the hand, and will afford a fair degree of purchase or a mechanical advantage when carrying out a brushing activity. But the handle does not take into account that some groomers are left-handed while others are right-handed, nor the fact that to carry out different modes of brushing activity, the handle must be controlled by the hand grasping it in a manner appropriate to these activities. Thus, if the necessary brushing movement in a given mode is in the axial direction of the handle, then the muscular force of the groomer should be applied in this direction. But if the brushing is in a lateral or other direction, a different set of muscles are entailed.

When a grooming brush handle is grasped by a hand of the groomer and the brush is then applied to the coat of a dog or other pet, the degree of pressure applied to the brush and the direction it take is a vector whose value depends on the muscles of the fingers and those in the wrist and arm that are brought into play to carry out the brushing activity. The appropriate vector for producing a vigorous down or up stroke of the brush differs from that necessary to effect a vigorous side stroke, and still another vector is required to effect a gentle stroke in any direction.

Conventional handles for grooming brushes, though utilitarian in design, fail to enlist human factors engineering or ergonomics as a design consideration. As a consequence, the use of such handled brushes, particularly in the case of groomers who are elderly or somewhat enfeebled, will quickly fatigue the groomer.

Human factors or ergonomics is an applied science dealing with the interaction of tools and their users, taking into account human capabilities and limitations. Thus, from the standpoint of ergonomics, a grooming brush handle should be designed to afford not only a firm grip, but also a purchase or mechanical advantage which exploits the muscles of the fingers, thumb, and those associated with the wrist and the arm so as to best carry out different modes of grooming activity.

Of prior art background interest is the Stowell et al. U.S. Pat. No. 4,974,286. This discloses a handle for a household or other hand-held implement that is provided adjacent its upper end where it joins the implement with concave depressions on either side of their handle. Anchored in each depression is an array of flexible fins to define grip sites which are occupied by the thumb and forefinger of the hand to enhance the user's grip on the handle.

Also of prior art interest are the Servilla U.S. Pat. No. 2,633,591 and to Grunz U.S. Pat. No. 4,490,875, and the French patent to Embroek 987,820.

SUMMARY OF INVENTION

In view of the foregoing, the main object of this invention is to provide a handle for a brush for grooming pets that satisfies ergonomic requirements and reduces user fatigue.

More particularly, an object of this invention is to provide a handle for a grooming brush which makes it possible for a groomer to grip the handle in a manner effecting optimal control of the brush for a selected mode of brushing activity, such as vigorous or light brushing.

Yet another object of the invention is to provide a handle of the above type which has an elongated body contoured to define center and left and right side thumb rests to receive the thumb of a right hand or a left hand of the groomer, so that the body of the handle may be firmly grasped by the groomer and prevented from rotating regardless of how vigorous the brushing activity, the grip which depends of which thumb rest is engaged being such as to effect optimal control for a selected mode of brushing activity.

Yet another object of the invention is to provide a handle whose elongated body has the configuration of the head of a pet.

Also an object of the invention is to provide a handle of the above type which may be mass produced at a low cost.

Briefly stated, these objects are accomplished in a handle for a grooming brush that makes it possible for a groomer to grip the handle in a manner effecting optimal control for a selected mode of brushing activity, such as vigorous, downstroke brushing. The handle has a contoured, elongated body, the front portion of which is joined to the rear of the brush at its center.

The body of the handle is contoured to define in the front portion thereof a raised center thumb rest and depression on either side thereof forming left and right side thumb rests. The groomer who grips the body of the handle with his firngers may then press his thumb onto the center thumb rest to carry out one mode of brushing activity, or onto either of the side thumb rests to carry out other modes of brushing activity.

BRIEF DESCRIPTION OF DRAWINGS

For a better understanding of the invention as well as other objects and further features thereof, reference is made to the following detailed description to be read on conjunction with the accompanying drawing, wherein:

FIG. 1 is a side view of a grooming brush having attached thereto a handle in accordance with one embodiment of the invention;

FIG. 2 is a transverse section taken through the body of the handle in the plane indicated by line 2—2 in FIG. 1;

FIG. 3 is a top view of the brush and handle;

FIG. 4 shows one manner of grasping the handle in which the thumb of the groomer's hand is pressed into the center thumb rest on the handle;

FIG. 5 shows another manner of grasping the handle, in which the thumb of the groomer's hand is pressed into a side thumb rest on the handle;

FIG. 6 shows a second embodiment of a handle in accordance with the invention as seen from the rear of the brush to which it is attached;

FIG. 7 is a side view of the handle;

DETAILED DESCRIPTION OF INVENTION

First Embodiment

Figure 9:
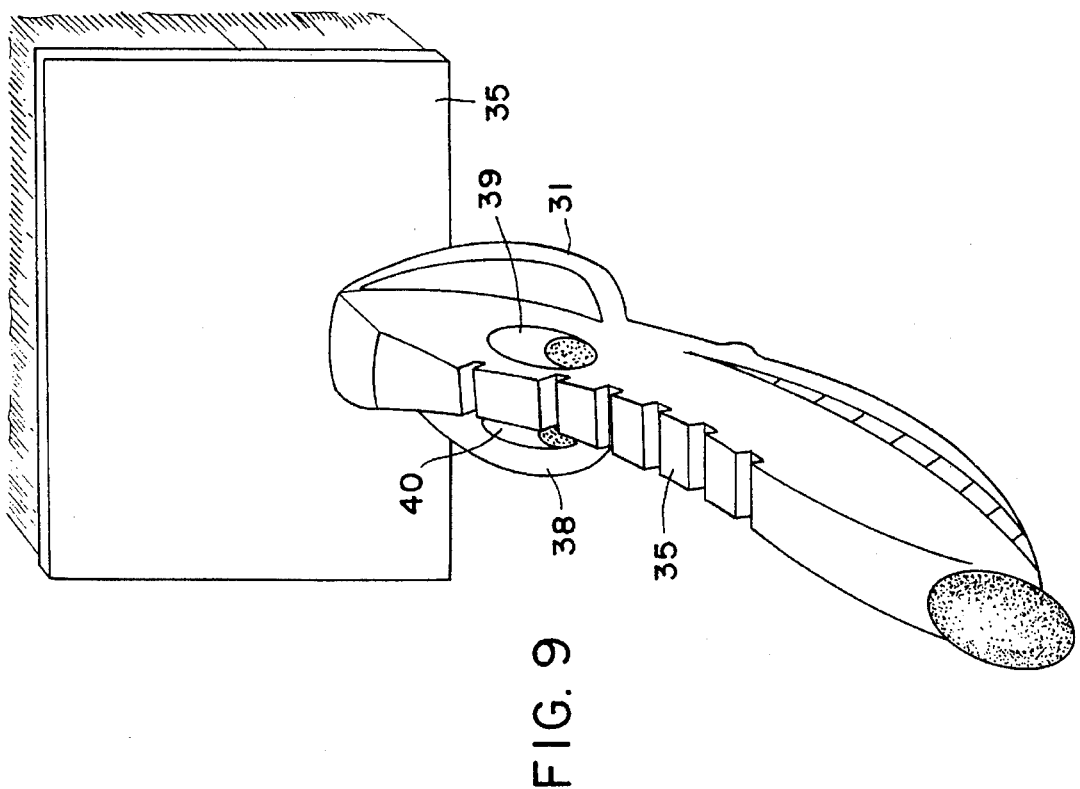
FIG. 9 illustrates a fourth embodiment of a handle in accordance with the invention which simulates the head of a pet.

Referring now to FIGS. 1 to 3, illustrated in these figures in a handle, generally designated by numeral 10, for a grooming brush having a rectangular base plate 12 on which is anchored an array 13 of bristles formed of stiff wire or synthetic plastic fibers. In practice, the brush may have a convex rather than a planar format. The handle, which has an elongated, contoured body 15 molded of high strength, synthetic plastic material, such as polypropylene or polycarbonate, has a leading end section 11 which is angled with respect to the body and is joined to the rear of plate 12 so that the body which extends from the leading end is at an acute angle to plate 12. Hence, when the brush engages the coat of a pet, the handle is angled with respect to the brush.

The leading end section 11 of the handle is snugly received within a socket 14 attached to the back of base plate 12 of the brush at its center. In practice, the surface of the handle body 15 may be textured or roughened to increase friction with the hand of the groomer grasping the body.

The contoured, elongated body 15 has a hump-shaped cross section, so that its upper surface is rounded and its undersurface is flat. The undersurface is corrugated to form a series of concave depressions 16, 17, 18 and 19 to accommodate the four fingers $F_1$, $F_2$, $F_3$ and $F_4$ of the groomer's hand, as shown in FIG. 4.

The elongated body 13 of the handle terminates in a flattened trailing end 20 having a hole 21 therein, so that when not in use, the handled brush may be suspended from a hook. The upper surface of the longated handle body 15 is provided on its leading end section 11 with a bulge or ridge 22 having inclined front and rear surfaces. A concave depression is formed in the upper surface of the body behind the ridge to define a center thumb rest 23, for this thumb rest is aligned with the center of the brush. Thus, as shown in FIG. 4, when thumb T on the hand of a groomer is pressed into center thumb rest 23, ridge 22 which rises above the thumb rest, acts as a bump or barrier to maintain the thumb within the center thumb rest.

A concave depression formed in the left side of the elongated handle body on its leading end section behind ridge 22 defines a left thumb rest 24. An identical right thumb rest 25 is defined by a concave depression on the right side of the leading end section.

Thus, the handle in one mode of brushing activity may be gripped in the manner illustrated in FIG. 4 in which fingers $F_1$ to $F_4$ of the groomer's hand engage finger rests 16 to 19, the rounded upper surface of the handle body being nested in the palm of this hand, so that the handle is then highly resistant to being turned.

In FIG. 4, which shows the hand grip for obtaining optimal control in a light brushing mode, thumb T of the hand then occupies the center thumb rest 23 of the handle, so that the thumb is centered with respect to the brush. In this light brushing mode, the muscular force for this purpose is derived from the muscles associated with the thumb and wrist W of the groomer. In light brushing in various directions, a high level of muscular power is not required, but the groomer must be able to readily control the direction of brushing, and it is the thumb in the center thumb rest that in this instance acts as the direction pointer or steering mechanism.

When vigorous brushing is required in repeated up, down or side strokes, then the greater power requirements for this purpose enlist the muscles of thumb T, those associated with wrist W and with arm A which together provide the driving force. In these modes of brushing activity, thumb T then occupies either left side thumb rest 24 or right side thumb rest 25, depending on whether the groomer engages the handle with his right or left hand. Hence, the handle is ambidextrous.

In manipulating the handle of the grooming brush, the groomer has no need to consciously assume a grip appropriate to the given mode of activity; for when engaged in light brushing, the groomer will then intuitively place his thumb in center thumb rest 23, for then he naturally gains better control of the brush movement. And when the groomer wishes to brush more vigorously and to exercise greater muscular effort toward this end, the groomer will then intuitively place his thumb in the appropriate side thumb rest.

Thus, a handle for a grooming brush for pets is of particular advantage to a professional groomer, for it permits the groomer to efficiently perform grooming activity on all parts of the pet's coat with a degree of vigor and in a direction best calculated to untangle and demat the entire coat and to remove dead, unwanted hair from the entire coat and to render the coat clean and lustrous.

Second Embodiment

In the handle 24, shown in FIGS. 6 and 7, the handle is attached to a concave brush having wire bristles. The leading end section 26 of the handle has an upper surface 27 that is curved to define an upper thumb rest. Concave depression on opposite sides of the upper thumb rest defines left and right side thumb rests 28 and 29. The underside of the elongated handle has spaced ridges 30, 31, etc., to form gripping regions for the respective fingers $F_1$ to $F_4$.

Thus a groomer who grips the body of this handle with his fingers may then press his thumb on the center thumb rest 27 to carry out one mode of brushing activity or press his thumb into side thumb rests 28 and 29 to carry out other modes of brushing activity.

Third Embodiment

Figure 8:
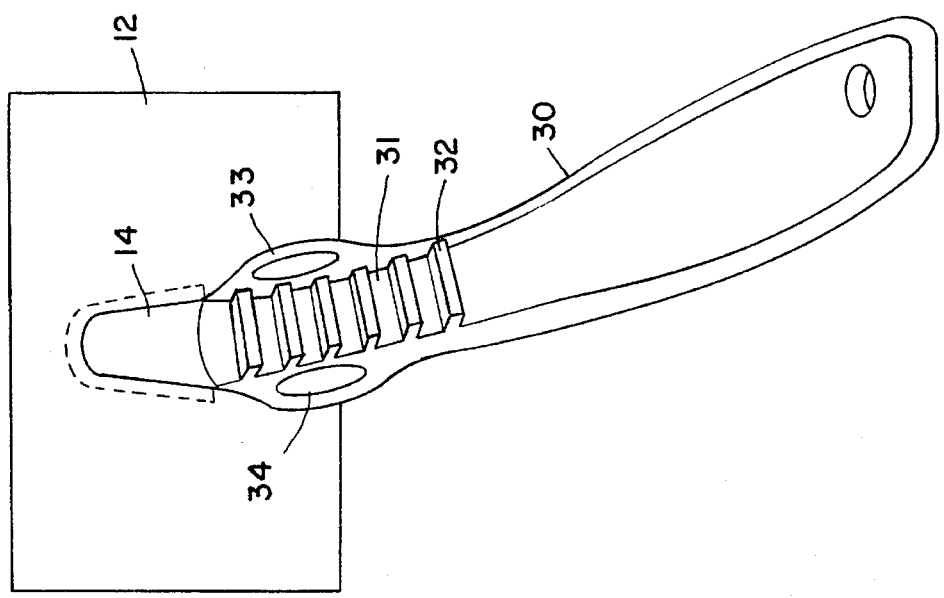
FIG. 8 illustrates a third embodiment of a handle in accordance with the invention as seen from the rear of the brush to which it is attached.

In the embodiment of the handle as shown in FIG. 8, the nose of the moldible plastic handle 30 is snugly received in the socket 14 attached to the back of base plate 12 of the brush, as in FIG. 1. However, the front portion of handle 30 which extends from the nose is contoured to define a raised bank 31 provided with a row of ridges 32 to create a center thumb rest. Flanking bank 31 are a depressed right section 33 and a depressed left section 34 forming right and left side thumb rests.

Thus a groomer who grips the body of handle 30 with his fingers, may press his thumb onto the center thumb rest 31, the thumb pressing into ridges 32 to prevent displacement of the thumb. Or the thumb may engage either the depressed right side rest 33 or the depressed left side thumb rest 34, depending on the desired mode of brushing activity.

Fourth Embodiment

In the handle 35 shown in FIG. 9, the handle which is molded of synthetic plastic material is configured to recreate the head of a dog or other pet, the handle being attached to the center of the back plate 35 of a grooming brush. The snout of this figure forms a raised bank 36 that is ridged to create a center thumb rest as in FIG. 8. The front portion of the handle on either side of bank 36 define ears 37 and 38, and the concave depression 39 and 40 in the sides of the bank which simulate eyes, form the right and left side thumb rests. The long side of the handle is made to resemble teeth.

Thus while the handle has the stylized shape of the head of a dog, it is provided with center and right and left side thumb rests these are selectively engaged by the thumb of the groomer, depending on the desired mode of brushing activity.

FIG. 9 illustrates a particular animal-like configuration. In practice the handle may come in other fanciful configurations, but regardless of the configuration, the handle contours must define a center as well as right and left side thumb gripping sites to facilitate manipulation of the brush in a desired mode of grooming activity.

While there have been shown and described preferred embodiments of a grooming brush handle in accordance with the invention, it will be appreciated that many changes and modifications may be made therein without, however, departing from the essential spirit thereof.

I claim:

1. A handle combined with a pet grooming brush having a base plate on which bristles are anchored that makes it possible for a groomer to grip the handle in a manner effecting optimal control for a selected mode of brushing activity, said handle comprising an elongated body whose front portion has a raised bank flanked by ear-like extensions and is joined at an angle to the base plate of the brush at its center, the raised bank being ridged to define in said front portion a center thumb rest, said raised bank having on either side thereof left and right side thumb rests adjacent said extensions whereby the groomer who grips the body of the handle with fingers of his hand may then press his thumb onto the center thumb rest to carry out one mode of brushing activity, or onto either the right side or the left side thumb rest to carry out other modes of brushing activity.

2. A handle as set forth in claim 1 in which the handle is molded of synthetic plastic material.

3. A handle as set forth in claim 1, in which the right and left thumb rests are defined by respective depressions on either side of the bank.

4. A handle as set forth in claim 3, in which the depressions are concave.

5. A handle as set forth in claim 1, in which the handle is configured to resemble the head of a dog, the bank defining the snout of the dog, the left and right side thumb rests being formed by depressions simulating eyes, the extensions forming the ears of the dog.

* * * * *